(12) United States Patent
Shahar

(10) Patent No.: US 6,676,780 B1
(45) Date of Patent: Jan. 13, 2004

(54) RADON SUPPRESSION

(75) Inventor: Ayal Shahar, West Terre Haute, IN (US)

(73) Assignee: Cadillac Products Packaging Company, Troy, MI (US)

( * ) Notice: Subject to any disclaimer, the term of this patent is extended or adjusted under 35 U.S.C. 154(b) by 0 days.

(21) Appl. No.: 10/349,900

(22) Filed: Jan. 22, 2003

Related U.S. Application Data

(63) Continuation-in-part of application No. 09/691,428, filed on Oct. 18, 2000, now abandoned.

(51) Int. Cl.[7] .............................................. B32B 31/00
(52) U.S. Cl. .................... 156/71; 52/169.5; 52/169.14; 52/408; 52/409; 428/542.8
(58) Field of Search ........................... 52/169.5, 169.14, 52/408, 409; 156/71; 428/542.8

(56) References Cited

U.S. PATENT DOCUMENTS 5,137,764 A * 8/1992 Doyle et al. ................... 428/44
2002/0061982 A1 * 5/2002 Donald et al. ............ 525/332.9

FOREIGN PATENT DOCUMENTS

GB          2 236 127    *  3/1991

* cited by examiner

*Primary Examiner*—Linda Gray
(74) *Attorney, Agent, or Firm*—Philip L. Bateman

(57) ABSTRACT

The flow of radon from the ground into a building is suppressed by placing a plastic film on or under the lowest floor of the building. The plastic film is made of a material having an oxygen diffusivity of less than about 10 cubic centimeters per day.

17 Claims, 1 Drawing Sheet

RADON SUPPRESSION

CROSS-REFERENCE TO RELATED APPLICATION

This application is a continuation-in-part of U.S. patent application Ser. No. 09/691,428, filed Oct. 18, 2000, now abandoned.

FIELD OF THE INVENTION

This invention relates to the suppression of the flow of radon into buildings.

BACKGROUND OF THE INVENTION

Radon is a gaseous element having the atomic number 86, i.e., an atom of radon has 86 protons in its nucleus and 86 electrons. Radon exists in the form of eighteen different isotopes. Isotopes are atoms of an element which contain different numbers of neutrons in their nuclei. All the radon isotopes are radioactive. Radioactivity is a process in which atoms undergo spontaneous nuclear transformations or decay by emitting atomic particles and electromagnetic energy. Radon undergoes alpha particle radiation in which the nuclei emit alpha particles consisting of two protons and two neutrons. The rate of radioactivity of a particular isotope is measured by its half-life. A half-life is the time for one-half of the atoms to undergo radioactive transformation. Seventeen of the radon isotopes have very short half-lives, ranging from a few seconds or less. Radon-222, the radon isotope containing 136 neutrons, is the most stable of the isotopes. It has a half-life of 3.8 days. Radon is known to cause many harmful effects on humans, including lung cancer.

Radon is constantly being formed by the radioactive decay of subterranean elements. Uranium (atomic number 92) decays into thorium (atomic number 90), thorium decays into radium (atomic number 88), and radium decays into radon. As a result, radon gas is constantly seeping upward through rock and soil toward the surface of the earth. It poses no risk when it reaches the atmosphere because its concentration is so small. However, radon can enter buildings and concentrate to dangerous levels, particularly in basements and first floors of buildings without basements. Radon levels vary considerably at different sites, and over time at any given site. Many factors cause these variations. For example, low pressure atmospheric conditions which often occur during storms are believed to draw higher levels of radon from the ground.

The health risks posed by radon have become more widely recognized in the past decade. The United States Environmental Protection Agency has recommended that homeowners take corrective action if the level of radon in their homes exceeds 4 picocuries per liter. There are two basic ways to lower radon levels in a building. The first is to remove the radon that is already there and the second is to suppress the flow of radon into the building.

The most common technique for removing existing radon from a building is to increase ventilation. Simply opening doors and windows can lower radon levels. Ventilation can be improved by the use of an air-to-air heat exchanger commonly known as a heat recovery ventilator. However, ventilation is difficult in basements with few, if any, windows or doors. Ventilation also results in the loss of conditioned air, discomfort, security problems, and increased costs of conditioning outside air.

The second basic way of lowering radon levels inside a building is to suppress the flow of radon into the building. The most common technique for suppressing the flow of radon into a building is to seal cracks and other openings in the building foundation. Sealing also reduces the loss of conditioned air, thereby making other radon suppression techniques more efficient. However, it is very difficult to identify and permanently seal every opening. Furthermore, normal settling of buildings creates new openings and reopens old ones.

Another common technique for suppressing the flow of radon into a building is to pressurize the inside of the building. Building pressurization typically uses a fan to blow air into the basement or living area from either upstairs or outdoors. The effectiveness of this technique depends on the building construction, climate, other appliances in the building, and occupant lifestyle. A major disadvantage of this method is that doors and windows must be left closed.

Another way of suppressing the flow of radon into a building is to suction the soil under the building. In buildings having a basement or a slab-on-grade foundation, suction pipes are inserted into the crushed rock or soil underneath. A fan is connected to the suction pipes which draws the gas from under the building to the atmosphere. Drain pipes that carry groundwater are sometimes used as the suction pipes.

A further way of suppressing the flow of radon into a building is to place a sheet of plastic film between the soil and the building. The sheet is typically placed over the soil beneath the building. Commonly used plastic films, including polyethylene and polypropylene, do not provide an effective barrier to radon. Furthermore, the plastic sheeting must be laid during building construction and it is difficult to completely cover the ground under the foundation. Plastic sheeting is also incorporated into the floor of the building. The use of radon barriers is disclosed in Doyle et al., U.S. Pat. No. 5,137,764, issued Aug. 11, 1992; and Schwilling et al., U.S. Pat. No. 5,174,800, issued Dec. 29, 1992.

Accordingly, a demand exists for an improved method of suppressing the flow of radon into buildings.

SUMMARY OF THE INVENTION

The general object of this invention is to provide an improved method of suppressing the flow of radon into buildings.

I have invented a method of suppressing the flow of radon from the ground into a building. The method comprises: (a) obtaining a sheet of plastic film having an oxygen diffusivity of less than about 10 cubic centimeters per day; and (b) placing the plastic film on or under the lowest floor of the building.

The method dramatically reduces the flow of radon into a building when the plastic film completely covers the floor. The method is relatively inexpensive and completely safe. It has no effect on the occupant and there are no operating costs.

DETAILED DESCRIPTION OF THE INVENTION

Figure 1:
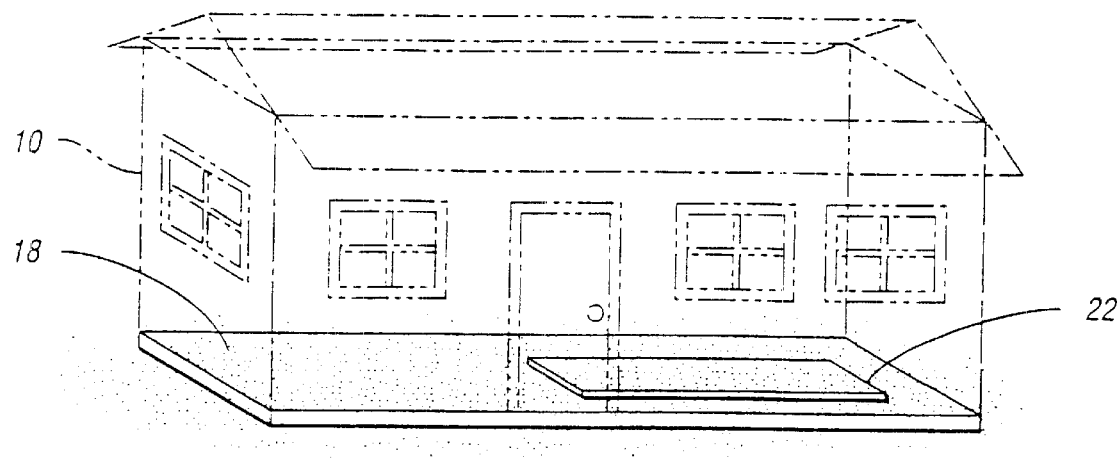
FIG. 1 is a perspective view of a building having a film layer.

This invention is best understood by reference to the drawings. FIG. 1 depicts a building 10 having a floor through which radon may enter. Carpet 18 covers the floor. Under the carpet is a sheet of plastic film 22. The plastic film is shown covering only part of the floor for illustration purposes. In practice, the plastic film would preferably cover the entire floor. Alternatively, the plastic film is placed under the floor and over the soil.

The plastic film is made of a material having a low radon diffusivity. The diffusivity of a plastic film can be quantified by the volume of a particular gas in cubic centimeters which passes in one day (24 hours) through a sheet of the material having a surface area of 100 square inches, a thickness of one mil (one one-thousandths of an inch, 0.001 inches), with a pressure differential of one atmosphere, at zero percent relative humidity, and at a temperature of 70° F. Measurements of radon diffusivity are not available. However, radon diffusivity is believed to correlate with the oxygen diffusivity and the oxygen diffusivity for many plastic films is known. Accordingly, a film's radon diffusivity is quantified indirectly herein by its oxygen diffusivity.

The plastic film has an oxygen diffusivity of less than about ten cubic centimeters per day, preferably less than about five cubic centimeters per day. Preferred plastic films having such a low oxygen diffusivity include ethylene vinyl alcohol (EVOH) copolymers which contain repeating units of ethylene [—$CH_2$—$CH_2$—] and of vinyl alcohol [—CHOH—$CH_2$—], polyvinylidene chloride (PVDC) which contains repeating units of vinylidene chloride [—$CH_2$—$CCl_2$—], nylon which contains repeating units of amides [—$CH_2$—CHCONH—], polyethylene terephthalate (PET) which contains repeating units of [—$C_{10}H_8O4$—], and polyvinyl alcohol (PVOH) which contains repeating units of vinyl alcohol [—CHOH—$CH_2$—]. Suitably low oxygen diffusivities are also obtained by coating high diffusivity plastic films such as polyethylene, polypropylene, or ethylene vinyl acetate with substrates such as aluminum, glass, silicon dioxide, aluminum oxide, and the like. The preferred plastic films are ethylene vinyl alcohol copolymers containing about 20 to 60 mole percent ethylene monomers. These copolymers have a very low oxygen/radon diffusivity.

The plastic films with low oxygen/radon diffusivities are generally more expensive than uncoated common polyolefin films, such as polyethylene, polypropylene, and ethylene vinyl acetate, which have oxygen diffusivities greater than ten cubic centimeters per day. In addition, the plastic films with low oxygen/radon diffusivities are generally stiffer and a have a poorer resistance to puncture. Accordingly, it is preferred to use a multilayer film having a layer of a plastic with a low oxygen/radon diffusivity sandwiched between layers of polyethylene, polypropylene, or ethylene vinyl acetate. Such a multilayer film combines the advantages of both films, the low radon diffusivity of the inner layer and the desirable physical characteristics of the outer layers.

Figure 2:
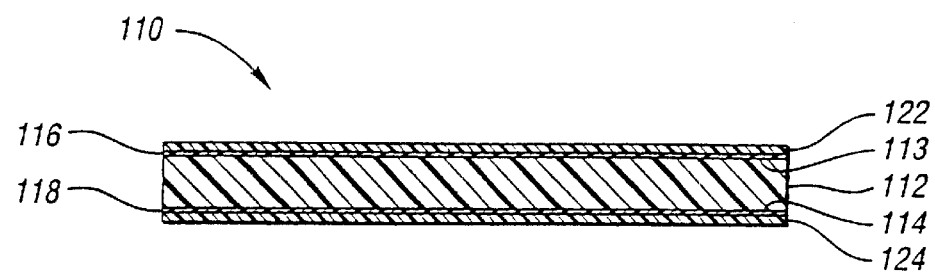
FIG. 2 is a cross section of a multilayer film.

FIG. 2 shows a preferred multilayer film 110 containing five separate layers. The film contains an inner layer 112 of ethylene vinyl alcohol copolymer having a first side 113 and a second side 114. A first adhesive layer 116 contacts the first side and a second adhesive layer 118 contacts the second side. The adhesive layers preferably comprise extrudable adhesives such as linear low density polyethylene or ethylene vinyl acetate. A first outer layer 122 contacts the first adhesive layer and a second outer layer 124 contacts the second adhesive layer. The outer layers are preferably polyethylene, polypropylene, or ethylene vinyl acetate.

The multilayer film is preferably about 0.5 to 20 mils in thickness and is most preferably about 1 to 10 mils in thickness. The ethylene vinyl alcohol copolymer preferably makes up about 5 to 70 percent of the thickness, the adhesive layers preferably make up about 5 to 40 percent of the thickness, and the outer layers preferably make up about 5 to 80 percent of the thickness.

The multilayer film is manufactured by a conventional extrusion process in which each layer is formed and extruded separately. The layers are then disposed in a side-by-side relationship to form the multilayer film.

Figure 3:
FIG. 3 is a cross section of a carpet liner having the multilayer film of FIG. 2.

The multilayer film is used by itself or is incorporated into a carpet liner as shown in FIG. 3. The liner 310 comprises a multilayer film 314 and a cushion 318. The cushion is conventional, such as a layer of foam of the type commonly used in carpet installation.

The plastic film is installed in the building in any one of a number of ways to create a barrier between the soil and the lowermost living space in the building. It can be spread across the soil beneath the foundation during construction. It can also be installed after construction by laying it down on the floor of the lowermost living space in the building, as shown in FIG. 1.

I claim:

1. A method of suppressing the flow of radon from the ground into a building, the method comprising:

(a) obtaining a sheet of multilayer plastic film comprising an inner layer having an oxygen diffusivity of less than about ten cubic centimeters per day and outer layers comprising polyethylene, polypropylene, or ethylene vinyl acetate; and (b) placing the plastic film on or under the lowest floor of the building.

2. The method of claim 1 wherein the plastic film is placed on the lowest floor of the building.

3. The method of claim 2 wherein the inner layer of the film comprises ethylene vinyl alcohol copolymers, polyvinylidene chloride, nylon, polyethylene terephthalate, or polyvinyl alcohol.

4. The method of claim 3 wherein the inner layer of the film comprises ethylene vinyl alcohol copolymers.

5. The method of claim 4 wherein the inner layer of the film comprises ethylene vinyl alcohol copolymers having about 20 to 60 mole percent ethylene monomers.

6. The method of claim 5 wherein the inner layer of the film has an oxygen diffusivity of less than about five cubic centimeters per day.

7. The method of claim 6 wherein adhesive layers are sandwiched between the inner layer and the outer layers.

8. The method of claim 7 wherein the multilayer film has a thickness of about 0.5 to 20 mils, and wherein the inner layer of ethylene vinyl alcohol copolymer comprises about 5 to 70 percent of the thickness, the adhesive layers comprise about 5 to 40 percent of the thickness, and the outer layers of polyethylene, polypropylene, or ethylene vinyl acetate comprise about 5 to 80 percent of the thickness.

9. A method of suppressing the ingress of radon gas from soil into a building through a floor of the building, the method comprising:

(a) providing a first layer comprising an ethylene vinyl comprising a plastic alcohol copolymer having a predetermined percent mole ethylene;

(b) providing a second layer wherein the plastic is different than ethylene vinyl alcohol copolymer adjacent the ethylene vinyl alcohol copolymer layer to form a multilayer film;

(c) disposing the multilayer film on or under the floor; and (d) covering the multilayer film.

10. The method of claim 9 wherein the predetermined percent mole of ethylene vinyl alcohol copolymer ranges between 20 to 60 percent of ethylene.

11. The method of claim 10 wherein the second layer comprises an adhesive layer.

12. The method of claim 11 wherein the second layer comprises a polyolefin.

13. The method of claim 12 wherein the ethylene vinyl alcohol copolymer layer is about 5 to 70 percent of a thickness of the multilayer film.

14. The method of claim 13 wherein the adhesive layer is about 5 to 40 percent of a thickness of the multilayer film.

15. The method of claim 14 wherein the plastic layer is about 5 to 80 percent of a thickness of the multilayer film.

16. The method of claim 9 wherein the disposing step further includes disposing the film adjacent the soil.

17. The method of claim 9 wherein the multilayer film has a thickness of between about 0.5 mil and 20 mil.

* * * * *